United States Patent [19]
Vogler

[11] Patent Number: 5,836,779
[45] Date of Patent: Nov. 17, 1998

[54] CODE CARD READER

[76] Inventor: Bernhard Vogler, Uniere Brunnengasse 3, D-97353 Wiesentheid, Germany

[21] Appl. No.: 811,212

[22] Filed: Mar. 5, 1997

[30] Foreign Application Priority Data

Mar. 5, 1996 [DE] Germany .......................... 196 08 403.2

[51] Int. Cl.$^6$ .................................................. H01R 13/15
[52] U.S. Cl. ............................................ 439/260; 235/479
[58] Field of Search ...................... 235/441, 475, 235/479, 482, 483, 486; 439/259–264, 310

[56] References Cited

U.S. PATENT DOCUMENTS

| | | | |
|---|---|---|---|
| 4,833,310 | 5/1989 | Shimamura et al. | 235/479 |
| 4,839,509 | 6/1989 | Yasuma et al. | 235/482 |
| 4,932,889 | 6/1990 | Bleier et al. | 439/260 |

FOREIGN PATENT DOCUMENTS 3 815 959 9/1989 Germany .
3 810 274 10/1989 Germany .

*Primary Examiner*—Khiem Nguyen
*Attorney, Agent, or Firm*—Foley & Lardner

[57] ABSTRACT

A code card reader having a contact which can be moved vertically relative to a code card so as to be brought into contact with the code card at the contact-making area of an integrated circuit of the code card. In a preferred embodiment, vertical movement of the contact carrier toward the code card may be provided in response to horizontal movement of the code card by means of a kinematically rigid gear mechanism.

10 Claims, 5 Drawing Sheets

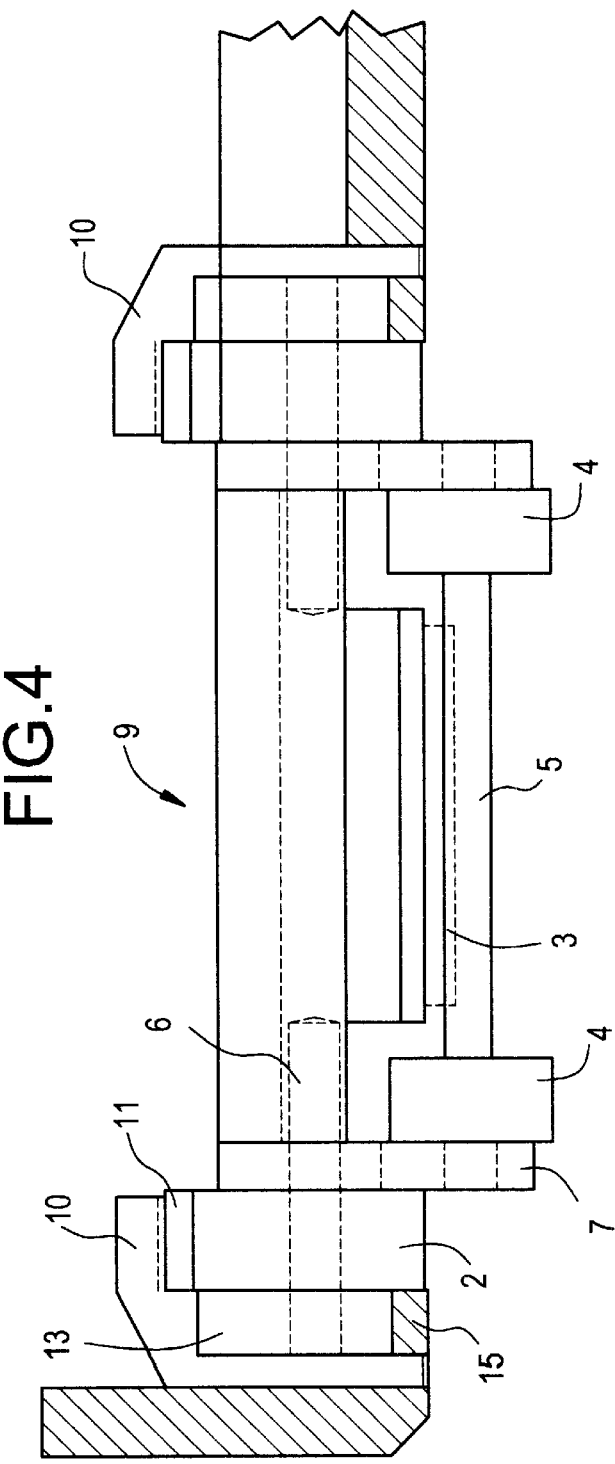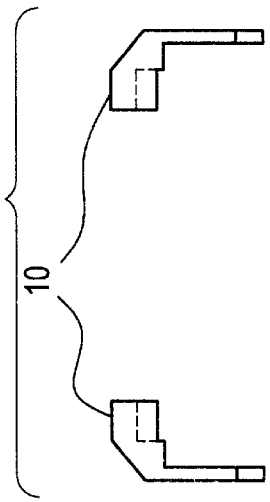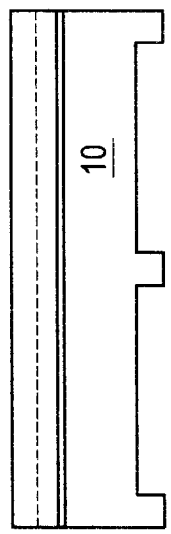

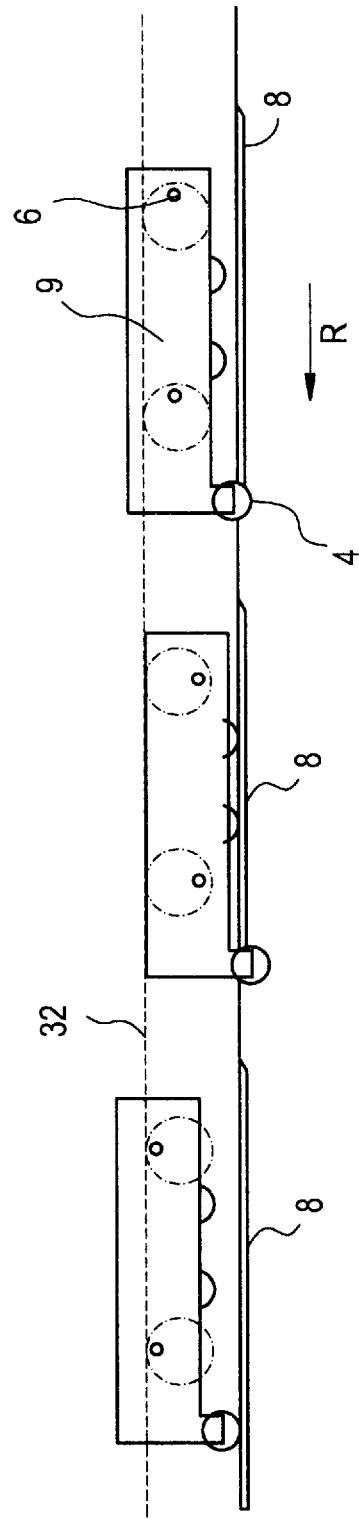

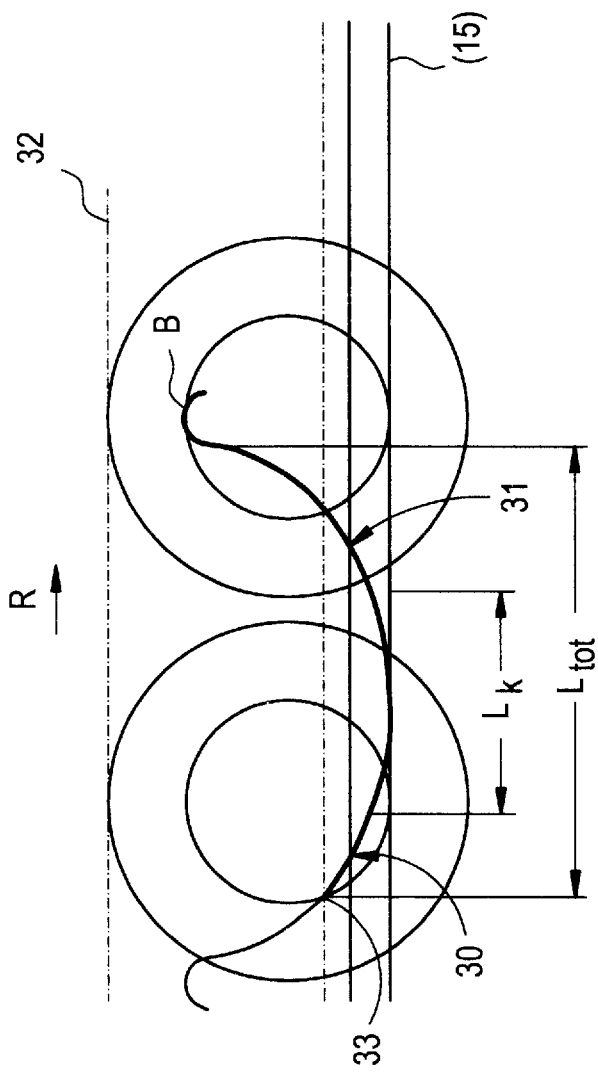

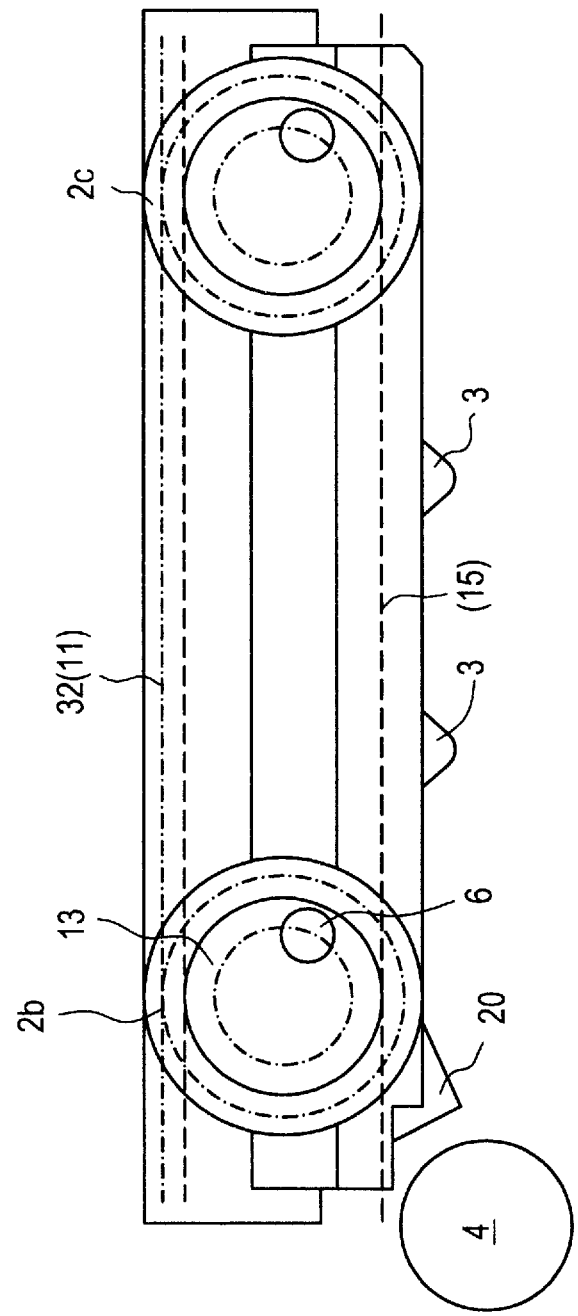

CODE CARD READER

BACKGROUND OF THE INVENTION

Code card readers are devices which are employed for reading cards which are used, for example, to provide access to automatic teller machines or for operation of control devices in safety areas or multilevel car parks. Some known code card readers utilize a motor drive by means of which a code card is pulled into the code card reader by using a friction drive. Either elastomer-coated rollers with counter-pressure rollers or coated toothed belts, flat belts or round belts are provided for this purpose.

When the code card is completely inserted into the code card reader, contacts provided on a contact carrier must be lowered onto a contact-making area of the code card in order to read the code card. German publication DE 38 15 959 describes a code card reader having a slide which has a stop against which the front end of the code card having an integrated circuit comes to bear. The slide travels with the card for the remainder of the push-in movement. As the card is being pushed in, the contact carrier moves with the card and is lowered toward the card with contact springs extended toward the card. The contact springs are thereby placed on the card. In order to guide the contact carrier, guides are provided which are situated parallel to the card track in the slide by way of housing parts arranged laterally with respect thereto. The guides serve to lead the contact carrier in a generally perpendicular direction onto the card track. In addition to a section running at an inclination with respect to the card track, the guides also have a section running horizontally with respect thereto, for placing the contact into satisfactory contact with the contact-making surface.

Lowering the contact carrier via an oblique plane entails friction problems, particularly over lengthy periods of service, which bring about a reduction in the force with which the card is pulled in. The pushing point of the card is also subjected to wear. This results in the risk of the card becoming unusable over time.

German publication DE 38 10 274 A1 discloses a code card reader having a contact carrier which can be lowered with the contacts in a positively locking manner. Guide means having different guideways are provided for this purpose. The contact carrier is moved into its lowered position by means of pressure exerted by the code card against the force of tension springs. The code card reader disclosed in this document functions according to the push-pull principle, that is to say a push force must be exerted on the code card when it is inserted into the card reader, in order to displace the contact carrier towards the read position. In the read position, the contact carrier is retained, together with the code card, by braking or holding means which counteract the force of the restoring springs. If it is desired to remove the card again after the reading operation, then it is necessary to pull on that end of the card which, in general, still protrudes from the code card reader, in order thereby to release the card and the contact carrier from the brake. When the card is pulled out, the contact carrier then also moves back into its initial position.

Code card readers are also known in which the code card is introduced completely into the card unit (for example a phonecard telephone) and the brake may be released by actuating a button, as a result of which the contact carrier moves back with the code card on account of the spring force.

SUMMARY OF THE INVENTION

Ever increasing requirements are made of code card readers due to the ever increasing miniaturization of the card readers in conjunction with an increase in the performance and rising popular acceptance of code cards. The structural height of the card reader must be as low as possible. In order to avoid damage which might ensue for the operator of the code card readers due to falsified cards, a possibility should be provided for withdrawing cards which have been identified as being forged or even stolen and for not returning said cards back to the user. Thus, for example, EC cards are withdrawn when the PIN code has not been correctly entered by the user after a stipulated number of attempts. Since code cards are being used more and more frequently, the reading unit must be configured in such a way that the code card is subject to minimum wear or only a low degree of wear. In particular, wear must be precluded on the abutting edge and the contact-making area, because otherwise the card becomes unusable.

Taking this problem appraisal as a departure point, it is intended to improve the known code card readers.

Accordingly, the invention relates to a code card reader having a contact carrier which is moveable in the vertical and horizontal directions and which has contacts which can be brought into contact with the contact-making area of an integrated circuit of a code card.

The problem solution is effected in the case of a code card reader of the generic type by virtue of the fact that the vertical movement of the contact carrier can be initiated as a function of the horizontal movement by means of a kinematically rigid gear mechanism. A long lasting contact-making path is achieved by this configuration, in spite of a low structural height. The contact carrier can be lowered onto the code card without the code card itself having to be diverted from its horizontal guideway. Since pushing friction of the kind produced in the event of lowering via oblique planes or lever mechanisms does not occur, the entire lowering and lifting operation is made substantially easier.

The gear mechanism is preferably formed by at least two gearwheels which are mounted eccentrically on the contact carrier and run on a stationary track while the contact carrier is pushed forward by the code card.

By virtue of this design, only rolling friction occurs, which is significantly lower than pushing friction. As a result, the force necessary to transport the card can be applied by a miniaturized drive motor. A toothed rack design of appropriate length permits a lifting movement of the contact carrier referring to the contact-making position in both directions. If the card is moved further in the push-in direction, the contact carrier lifts in the same way as when the card is moved back. As a result, the code card can, as required, be guided further into the reading unit in order to retain said card or be returned to the user.

In order to move the contact carrier forward by the code card, the contact carrier has, in particular, preferably on its front end in the push-in direction, a stop, the code card abutting against the stop taking the contact carrier along in the horizontal direction. This stop is formed by at least one roller. The stop is preferably formed by two rollers which are arranged at a parallel distance such that they cannot roll over the contact-making area of the code card when the card is to be retained, because this could result in damage to the contact-making area.

The trajectory of the contact carrier, that is to say a point on the contact carrier, describes an epicycloid during the combined horizontal/vertical movement. This results in a steep lowering and lifting curve in conjunction with a shallow contact-making length.

The contact carrier is preferably moved back by means of spring forces.

Accordingly, it is an object of the invention to provide a code card reader which includes a contact for contacting a contact-making area of an integrated circuit of a code card, and a means for bringing the contact into contact with the contact-making area in a manner which reduces the wear on the contact and contact-making area in comparison to present known devices.

It is a further object of the invention to provide a code card reader in which the contact is moved into engagement with the contact-making area of the code card in a generally vertical direction so as to avoid producing wear through sliding engagement of the contact and contact making area.

It is another object of the invention to provide a method for operating a code card reader in a manner such that a code card may be read without causing the degree of wear presently caused by known code card readers.

It is a further object of the invention to provide a method for operating a code card reader in a manner such that the contact of the code card reader is placed into contact with the contact making area of the code card in a generally vertical direction so as to avoid producing wear through sliding engagement of the contact and contact making area.

BRIEF DESCRIPTION OF THE DRAWINGS

An exemplary embodiment of the invention will be explained in more detail below with reference to the drawings, in which:

FIG. 4 shows a view of the contact carrier, similarly to FIG. 3, in a simplified illustration of further components of the reading unit;

FIG. 5 shows a side view of a guide part for the contact carrier;

FIG. 6 shows a diagrammatic illustration of the arrangement of the guide parts in accordance with FIG. 5 in the reading unit;

FIG. 7 shows movement of the contact carrier in three phases of the insertion of the code card;

FIG. 8 shows a trajectory of the contact carrier; and

FIG. 9 shows a simplified side view of the contact carrier which is enlarged in comparison with FIG. 2.

Figure 2:
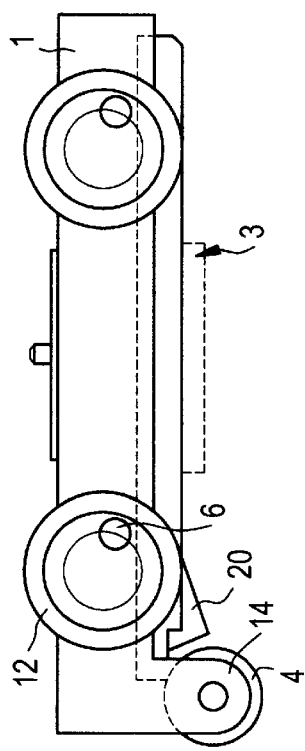
FIG. 2 shows a view of the contact carrier in accordance with viewing arrow II of FIG. 1.

The reference numerals and letters employed in the Figures refer to elements of the illustrated embodiments and other illustrated features as follows:

1 Frame
2 Gearwheel
2a Gearwheel
2b Gearwheel
2c Gearwheel
3 Contacts
4 Roller
5 Axle
6 Eccentric axle
7 Center ring
8 Code card
9 Contact carrier
10 Track
11 Toothed rack
12 Teeth of gearwheel
13 Cylindrical attachment
14 Attachment
15 Guideway
20 Switch
30 Beginning of contact-making
31 End of contact-making
32 Pitch line of toothed rack
R Push-in direction
B Trajectory
$L_K$ Contact-making length
$L_{tot}$ Total distance

DETAILED DESCRIPTION OF PREFERRED EMBODIMENTS

Figure 3:
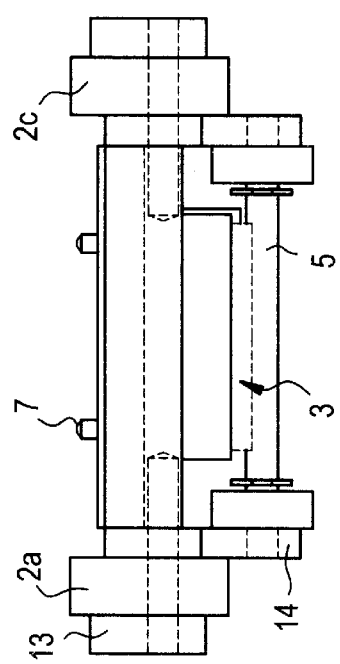
FIG. 3 shows a view of the contact carrier in accordance with viewing arrow III of FIG. 1.
Figure 1:
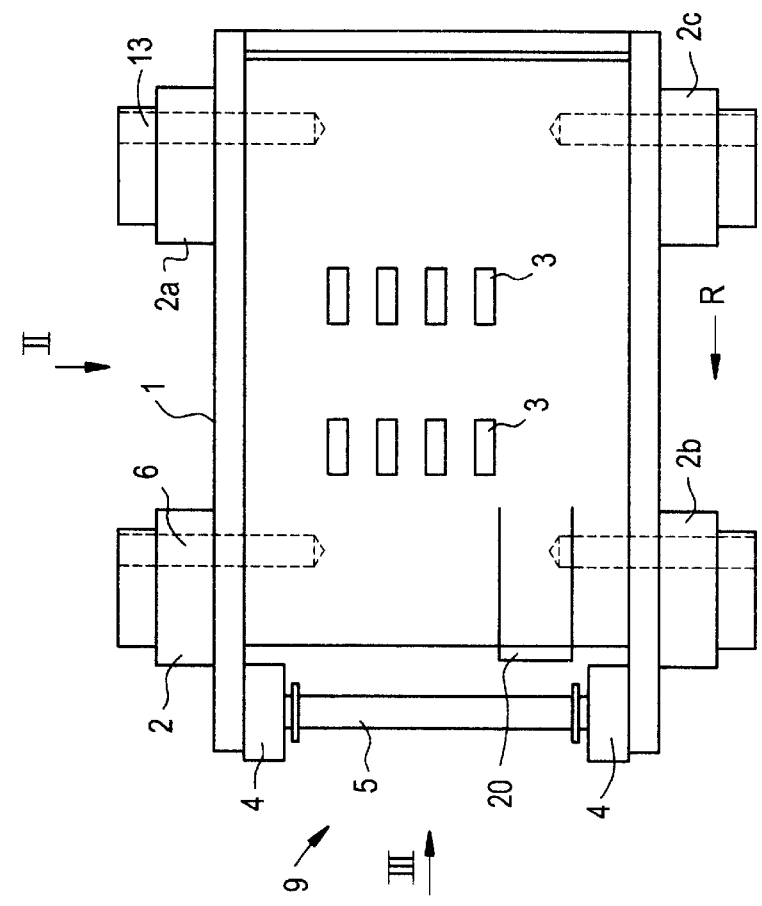
FIG. 1 shows a bottom view of the contact carrier.

As shown by FIGS. 1 to 3, a preferred embodiment of the contact carrier 9 may include a frame 1 having gearwheels 2, 2a, 2b, 2c which are mounted eccentrically on the sides of the frame 1. In its central region, the contact carrier 9 has a plurality of contacts 3 on its underside, the contacts being arranged resiliently in the vertical direction. On its front end in the push-in direction R of the contact carrier 9, the contact carrier 9 may be provided with two rollers 4 which are connected to one another by means of an axle 5 and which are respectively mounted on two forward-extending parts of the frame 1. Their axle therefore extends at right angles to the push-in direction R. Cylindrical attachments 13 may in each case be provided laterally over the gearwheels 2, 2a, 2b, 2c, in a manner such that they project outwardly and are connected concentrically to the gearwheels 2, 2a, 2b, 2c. Center rings 7 are provided on the top side of the contact carrier 9 to enable correct placement of a printed circuit board supporting the contact pins 3.

Referring now to FIG. 4, the cylindrical attachments 13 of the gearwheels 2, 2a, 2b, 2c may run on guideways 15 which are arranged horizontally in the reading unit. The teeth 11 of the gearwheels 2, 2a, 2b, 2c may roll on one or two correspondingly toothed tracks 10, which are located above and laterally adjacent to guideway 15. The two tracks 10, shown for example in FIGS. 5 and 6, extend in the push-in direction R and are separated in accordance with the axial distance between the gearwheel pairs 2, 2b; 2a, 2c serve as guide parts for the contact carrier 9. Due to the eccentric mounting (eccentric axle 6) of the gearwheels 2, 2a, 2b, 2c on the frame 1 as well as the concentric arrangement of the cylindrical attachments 13 on the gearwheels 2, 2a, 2b, 2c, the contact carrier 9 moves vertically as a function of the distance moved by the frame 1 in a horizontal direction. When the eccentric axle 6 is located at its lowest point relative to the frame as shown in FIG. 4, the contact carrier 9 is lowered, and hence so are the contacts 3. Similarly, when the eccentric axle 6 is located at its highest point relative to the frame 1, the contact carrier 9 is lifted.

This movement is illustrated in FIGS. 7 through 9. The pitch line of the teeth 11 of the track 10 is designated by reference numeral 32 in these figures. In its initial position, shown at the far right of FIG. 7, the contact carrier 9 is located in a central position. The eccentric axles 6 of the gearwheels 2, 2a, 2b, 2c are located in their rear position referring to the push-in direction R. When the code card 8 is introduced into the reading unit it makes contact with two rollers 4. The code card 8 may be pulled in, for example, in a known manner such as by means of a friction drive. Once the code card 8 makes contact with the rollers 4, the contact carrier 9 will be pushed along by the motion of the card in the push-in direction R. The gearwheels 2, 2a, 2b, 2c, which are illustrated by broken lines in FIG. 7, roll in the clockwise direction in the track 10. In the illustrated embodiment, the contact carrier 9 describes an epicycloid path B as illustrated in FIG. 8 (note however that the direction of movement illustrated in FIG. 8 is opposite that illustrated in FIG. 7).

Referring further to FIGS. 7 and 8, the point 33 represents a position of the axle (not shown) when the code card 8 first makes contact with the rollers 4. At this point the contact carrier 9 is in a vertically central position. During the further progression of the code card, as shown in the middle portion of FIG. 7, the contact carrier 9 is lowered further until the spring-loaded contacts 3 begin to make contact with a contact-making area (not shown) of a code card 8. This position is identified in FIG. 8 by reference numeral 30. The effective contact-making length is designated in FIG. 8 by $L_K$. This is the region in which it is ensured that contact is established between the contact area of the code card and the contacts 3 so that the code card 8 can be read.

During further progression as shown in the left-most portion of FIG. 7, the contact carrier 9 begins to be lifted from the code card 8, the contacts 3 relinquishing contact with the contact-making area on the code card at the point designated in FIG. 8 by position 31. The total distance of movement of the frame $L_{tot}$ is covered when the eccentric axles 6 of the gearwheels 2, 2a, 2b, 2c have reached top dead center. At this point in time, the contact carrier 9 has been lifted to an extent such that the code card 8 may be transported further in the push-in direction R, for example by sliding under the rollers 4. Since the rollers 4 will roll on the code card, virtually no wear occurs on the code card 8. Alternatively, if the code card 8 is to be returned rather than retained, it may be driven from the central position in accordance with FIG. 7 in a direction opposite that of the push-in direction R. The contact carrier 9 is pulled back into its initial position, for example, by means of spring forces.

For the purpose of reliably initiating the reading operation, a switch 20 as shown in FIG. 9 may be provided on the frame 1. The switch may be located on the frame 1 so as to be activated when the contacts 3 are securely placed on the code card 8 within the contact-making range $L_K$. Only then will the reading operation be initiated.

The disclosed embodiment thus serves to vary the position of the contact relative to a code card received horizontally by the code card reader as a function of distance of horizontal movement of said code card received by the device. It will be appreciated by those having ordinary skill in the art that the invention may be practiced in the form of other code card reading devices which include alternative means for varying the position of the contact relative to a code card received horizontally by the code card reader as a function of distance of horizontal movement of said code card received by the device.

The entirety of German Application 196 08 403.2, filed Mar. 5, 1996, is expressly incorporated herein by reference.

What is claimed is:

1. A code card reader comprising:
    a contact for contacting a contact-making area of an integrated circuit of a code card;
    means for varying vertical distance between said contact and a code card received by said code card reader comprising a contact carrier and at least two wheels mounted eccentrically on the contact carrier for varying the vertical distance between said contact carrier and said code card; and
    a track providing a path of rolling motion of said wheels.

2. The code card reader of claim 1, wherein said at least two wheels comprise gearwheels and wherein said track comprises teeth for engaging teeth of said gearwheels.

3. The code card reader of claim 2, wherein said contact carrier further comprises a stop for engaging a forward edge of said code card.

4. The code card reader of claim 3, wherein said stop comprises at least one roller.

5. The code card reader of claim 1, wherein a trajectory of said contact describes an epicycloid.

6. A method for operating a code card reader comprising the steps of:
    receiving a code card; and
    moving a contact of said code card reader toward a contact-making area of said code card alone an epicycloid trajectory to make contact with said contact-making area.

7. The method of claim 6, further comprising the steps of:
    reading said code card; and
    transporting said code card in the direction of motion of said code card during said receiving of said code card.

8. A code card reader comprising:
    a contact for contacting a contact-making surface of an integrated circuit of a code card; and
    a mechanism for varying a relative distance between said contact and a code card received by said code card reader in a direction substantially perpendicular to said contact making surface as a function of distance of movement of said code card in a direction of insertion of said code card and along an epicycloid trajectory.

9. The code card reader of claim 8 wherein said mechanism includes eccentrically mounted wheels.

10. The code card reader of claim 9 wherein said wheels are gearwheels.

* * * * *